(12) United States Patent
Kang

(10) Patent No.: US 12,262,107 B2
(45) Date of Patent: Mar. 25, 2025

(54) VEHICLE AND METHOD OF CONTROLLING THE SAME USING AN IMAGE RECORDING DEVICE AND AN ULTRASONIC SENSOR

(71) Applicants: Hyundai Motor Company, Seoul (KR); Kia Corporation, Seoul (KR)

(72) Inventor: Minchul Kang, Uiwang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 183 days.

(21) Appl. No.: 18/065,455

(22) Filed: Dec. 13, 2022

(65) Prior Publication Data

US 2023/0353859 A1 Nov. 2, 2023

(30) Foreign Application Priority Data

Apr. 27, 2022 (KR) .................. 10-2022-0052241

(51) Int. Cl.
G08B 21/00 (2006.01)
G01S 15/89 (2006.01)
H04N 7/18 (2006.01)
H04N 23/61 (2023.01)
H04N 23/667 (2023.01)
H04N 23/65 (2023.01)

(52) U.S. Cl.
CPC .............. *H04N 23/61* (2023.01); *G01S 15/89* (2013.01); *H04N 7/188* (2013.01); *H04N 23/667* (2023.01); *H04N 23/651* (2023.01)

(58) Field of Classification Search
CPC ...... H04N 23/61; H04N 7/188; H04N 23/667; H04N 23/651; H04N 5/77; G01S 15/89; G01S 15/04; G01S 15/88; G01S 15/86; G01S 7/52004; G07C 5/0866
USPC ........................................................ 340/937
See application file for complete search history.

(56) References Cited

U.S. PATENT DOCUMENTS

| 11,616,932 | B1 * | 3/2023 | Xu ...................... H04W 4/38 348/207.99 |
| 2012/0275263 | A1 * | 11/2012 | Kloss ................ G01S 7/52004 367/13 |
| 2021/0146916 | A1 * | 5/2021 | Lee .................... G01S 15/101 |

FOREIGN PATENT DOCUMENTS

| JP | 2009280109 A | * | 12/2009 | ............ G07C 5/0866 |
| KR | 102333470 B1 | * | 12/2021 | ............ G08G 1/168 |
| MX | 2012008184 A | * | 1/2014 | ............ G08G 1/168 |
| WO | WO-2018134152 A1 | * | 7/2018 | |
| WO | WO-2020136941 A1 | * | 7/2020 | ............ B60R 11/04 |

* cited by examiner

*Primary Examiner* — Mark S Rushing
(74) *Attorney, Agent, or Firm* — Slater Matsil, LLP

(57) ABSTRACT

An embodiment vehicle includes an image recording device, an ultrasonic sensor, and a controller configured to operate the ultrasonic sensor in response to parking of the vehicle, operate the image recording device to a standby mode, switch the image recording device to an active mode based on a detection of an object located around the vehicle by the ultrasonic sensor, and control the image recording device to store an image of surroundings of the vehicle obtained by the image recording device.

20 Claims, 5 Drawing Sheets

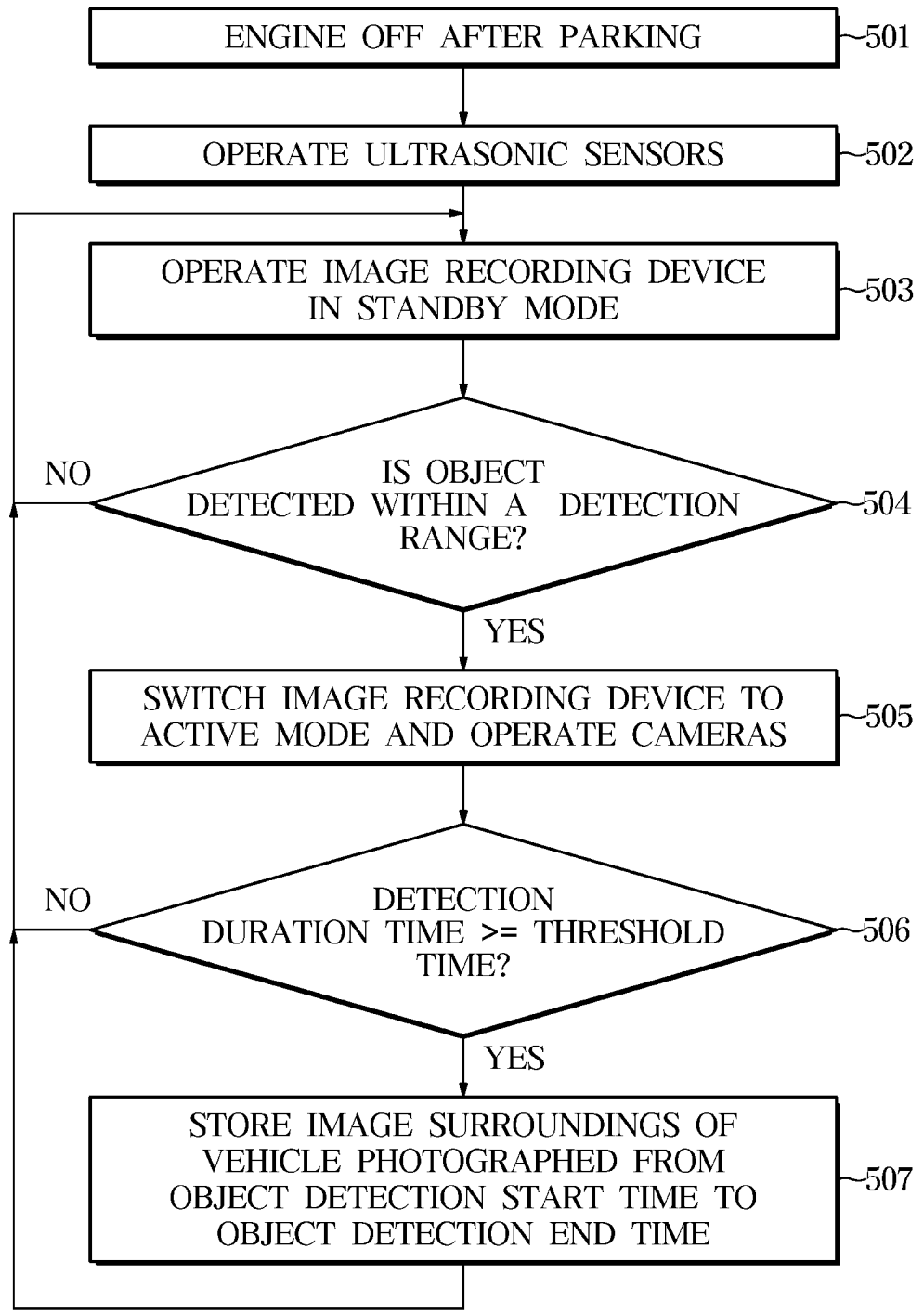

VEHICLE AND METHOD OF CONTROLLING THE SAME USING AN IMAGE RECORDING DEVICE AND AN ULTRASONIC SENSOR

CROSS-REFERENCE TO RELATED APPLICATIONS

This application claims the benefit of Korean Patent Application No. 10-2022-0052241, filed on Apr. 27, 2022, which application is hereby incorporated herein by reference.

TECHNICAL FIELD

The present disclosure relates to a vehicle and a method of controlling the same.

BACKGROUND

Recently, a vehicle is provided with an image recording device for acquiring images in front of and behind the vehicle. An image recording device, such as a black box or a built-in cam, creates and stores images by photographing the front and rear of the vehicle in a parked state of the vehicle.

As a method of storing images of the surroundings of the vehicle in a parked state, a regular recording method that periodically stores images of a certain section while operating a device at all times and a shock recording method that stores images of a certain section when an impact occurs to the vehicle are provided.

However, a conventional regular recording method consumes a large amount of a battery provided in a vehicle, so that the problems that the battery is discharged and fuel efficiency is reduced occur. In addition, a conventional shock recording method stores short images when an impact occurs, such that it is difficult to analyze the situation before and after the accident only with the stored images.

SUMMARY

The present disclosure relates to a vehicle and a method of controlling the same. Particular embodiments relate to a vehicle capable of efficiently obtaining an image around the vehicle in a parked state and a method of controlling the same.

An embodiment of the present disclosure provides a vehicle configured for controlling an image recording device to store an image of surroundings of the vehicle when an object is detected around the vehicle using an ultrasonic sensor upon parking and a method of controlling the same.

Additional embodiments of the disclosure will be set forth in part in the description which follows and, in part, will be obvious from the description, or may be learned by practice of the disclosure.

In accordance with an embodiment of the disclosure, a vehicle includes an image recording device configured to photograph surroundings of the vehicle and obtain an image of the surroundings of the vehicle, an ultrasonic sensor configured to detect an object located around the vehicle, and a controller configured to operate the ultrasonic sensor in response to parking of the vehicle, operate the image recording device to a standby mode, switch the image recording device to an active mode based on a detection of the object around the vehicle by the ultrasonic sensor, and control the image recording device to store one or more images of the surroundings of the vehicle.

The controller may control the image recording device to store the image of the surroundings of the vehicle photographed from an object detection start time to an object detection end time.

The controller may switch the image recording device to the active mode based on the detection of the object within a predetermined detection range of the ultrasonic sensor.

The controller may adjust a detection range of the ultrasonic sensor based on a detection range selection instruction obtained through an input device.

The controller may control the image recording device to store the image of the surroundings of the vehicle based on a predetermined image storage condition after the image recording device is switched to the active mode.

The controller may control the image recording device to store the image of the surroundings of the vehicle based on a detection duration time of the object being longer than or equal to a predetermined threshold time within the detection range.

The controller may adjust the threshold time based on a threshold time selection instruction obtained through an input device.

The controller may switch the image recording device to the standby mode based on a detection duration time of the object being shorter than a predetermined threshold time after the image recording device is switched to the active mode.

The controller may adjust sensitivity for the detection of the object based on a sensitivity selection instruction obtained through an input device.

In accordance with another embodiment of the disclosure, a method of controlling a vehicle is provided. The method includes operating, by a controller, an ultrasonic sensor to detect an object located around the vehicle in response to parking of the vehicle, operating an image recording device configured to photograph surroundings of the vehicle in a standby mode, switching, by the controller, the image recording device to an active mode based on a detection of the object in a vicinity of the vehicle, and storing, by the controller, one or more images of the surroundings of the vehicle obtained by the image recording device.

The storing of the image of the surroundings of the vehicle may further include storing, by the controller, the image of the surroundings of the vehicle photographed from an object detection start time to an object detection end time.

The switching the image recording device to the active mode may further include performing, by the controller, based on the detection of the object within a predetermined detection range of the ultrasonic sensor.

The detection range of the ultrasonic sensor may be adjusted based on a detection range selection instruction obtained through an input device.

The storing of the image of the surroundings of the vehicle may further include performing, by the controller, based on satisfying a predetermined image storage condition after the image recording device is switched to the active mode.

The storing of the image of the surroundings of the vehicle may further include performing, by the controller, based on a detection duration time of the object being longer than or equal to a predetermined threshold time within the detection range.

The threshold time may be adjusted based on a threshold time selection instruction obtained through an input device.

The method may further include switching, by the controller, the image recording device to the standby mode based on a detection duration time of the object being shorter than a predetermined threshold time after the image recording device is switched to the active mode.

The method may further include adjusting, by the controller, sensitivity for the detection of the object based on a sensitivity selection instruction obtained through an input device.

BRIEF DESCRIPTION OF THE DRAWINGS

These and/or other features of embodiments of the disclosure will become apparent and more readily appreciated from the following description of exemplary embodiments, taken in conjunction with the accompanying drawings, in which:

FIG. 5 is a flowchart illustrating a method of controlling a vehicle according to an exemplary embodiment of the present disclosure.

DETAILED DESCRIPTION OF ILLUSTRATIVE EMBODIMENTS

Figure 1:
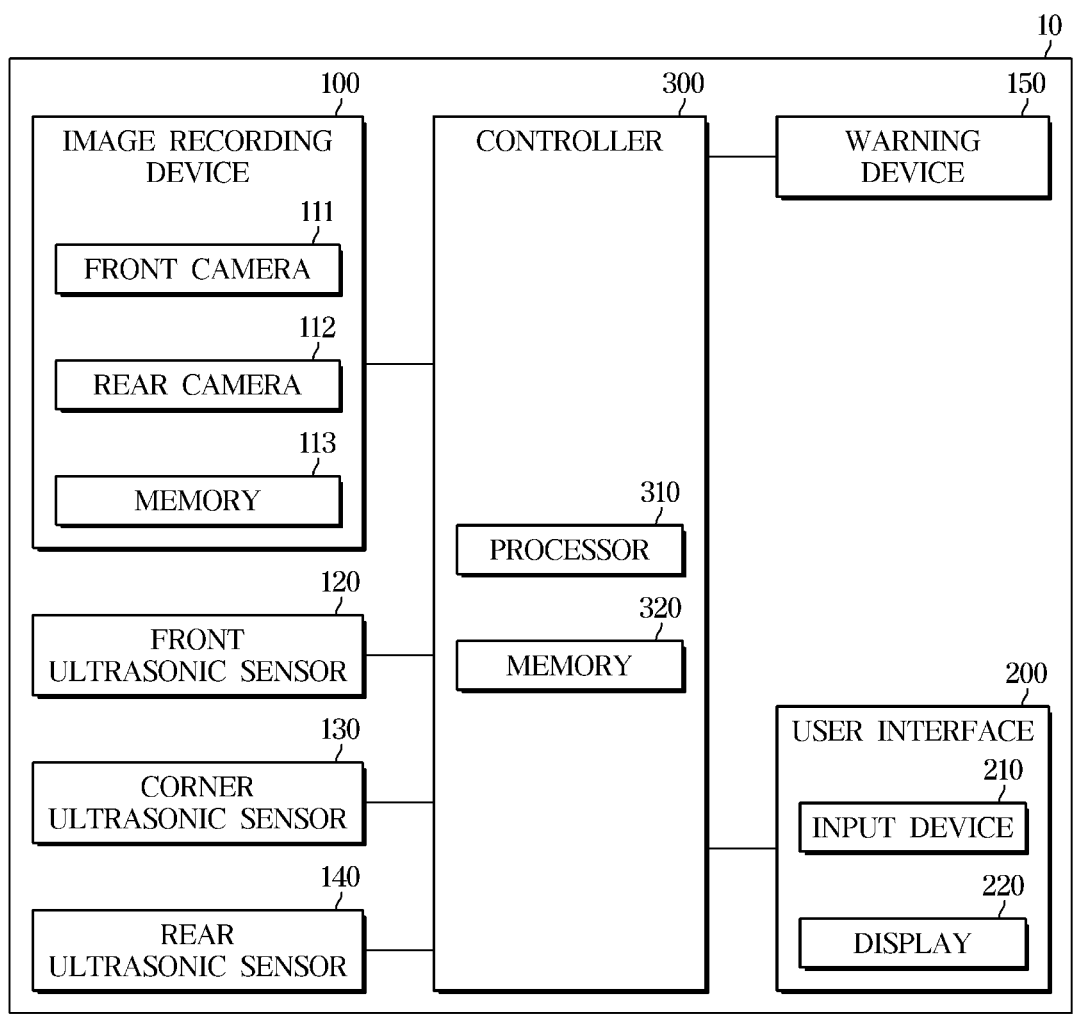
FIG. 1 is a control block view illustrating a vehicle according to an exemplary embodiment of the present disclosure.

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'parts', 'modules', 'members', 'blocks' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

Figure 2:
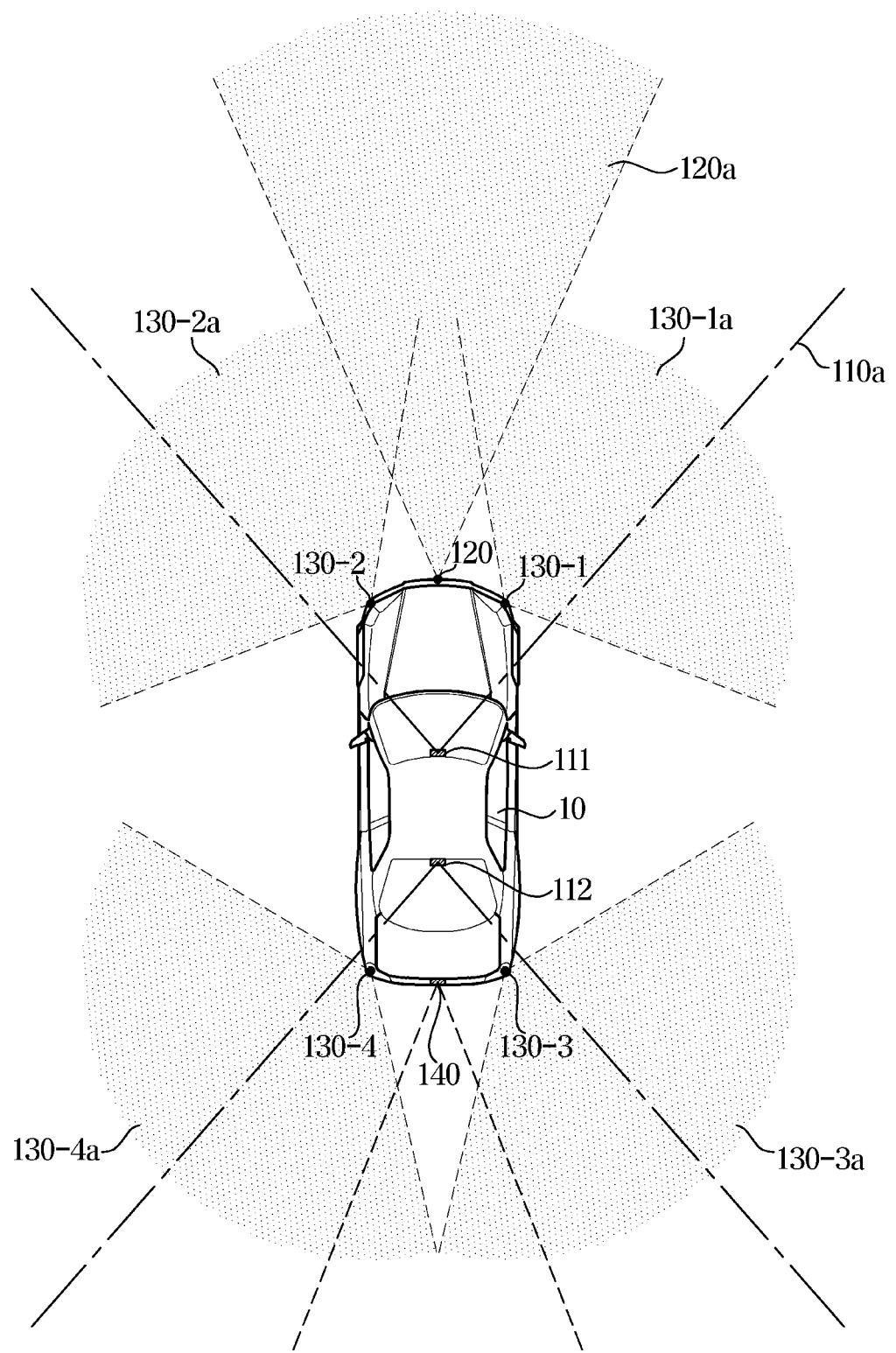
FIG. 2 is a view illustrating a camera and an ultrasonic sensor provided in a vehicle according to an exemplary embodiment of the present disclosure.

FIG. 1 is a control block view illustrating a vehicle according to an exemplary embodiment of the present disclosure. FIG. 2 is a view illustrating a camera and an ultrasonic sensor provided in a vehicle according to an exemplary embodiment of the present disclosure.

Referring to FIG. 1, a vehicle 10 according to an exemplary embodiment of the disclosure may include an image recording device 100, a front ultrasonic sensor 120, a corner ultrasonic sensor 130, a rear ultrasonic sensor 140, a warning device 150, a user interface 200, and a controller 300. The controller 300 may be electrically connected to various devices included in the vehicle 10 and control the various devices.

The image recording device 100 may photograph surroundings of the vehicle. The image recording device wo may include a front camera 111, a rear camera 112, and a memory 113. Depending on a design of the vehicle 10, the image recording device 100 may further include a side camera (not shown). The image recording device wo may obtain images regarding a front and rear of the vehicle. The image recording device 100 may be referred to as a black box or a built-in cam. Although not shown in the drawings, the image recording device 100 may include a separate processor.

The image recording device 100 may create and store one or more images of the surroundings of the vehicle by photographing the front and rear of the vehicle 10 in a parked state of the vehicle 10. A recording mode of the image recording device wo for storing the images of the surroundings of the vehicle in the parked state may be provided as a regular recording mode that periodically stores images of a certain section while the image recording device 100 is always operated, a shock recording mode that stores images of a certain section when an impact occurs to the vehicle 10, and a detection recording mode that stores the images of the surroundings of the vehicle when an object is detected in a vicinity of the vehicle 10. The user may select the regular recording mode, the shock recording mode, or the detection recording mode.

The front camera 111 may photograph the front of the vehicle 10 and obtain front image data of the vehicle 10. The rear camera 112 may photograph the rear of the vehicle 10 and obtain rear image data of the vehicle 10. The memory 113 may store the front image data obtained by the front camera in and the rear image data obtained by the rear camera 112.

Referring to FIG. 2, the front camera 111 may have a field of view 110a facing forward. The front camera 111 may be installed, for example, on a front windshield of the vehicle 10. The front and rear cameras 111 and 112 may include a plurality of lenses and image sensors. The image sensor may include a plurality of photodiodes that convert light into an electrical signal, and the plurality of photodiodes may be arranged in a two-dimensional matrix.

The front and rear cameras 111 and 112 may be electrically connected to the memory 113 of the image recording device 100 and may be electrically connected to the controller 300. For example, the cameras 111 and 112 are connected to the controller 300 via a vehicle communication network (NT), connected to the controller 300 via a hard wire, or connected to the controller 300 via a printed circuit board (PCB).

A plurality of ultrasonic sensors may be provided in the vehicle 10. The ultrasonic sensor may detect an object located around the vehicle. The front ultrasonic sensor 120 may obtain front ultrasonic data by emitting ultrasonic signals to the front of the vehicle 10 and receiving echo ultrasonic signals reflected from an object positioned in front. The corner ultrasonic sensor 130 may obtain corner ultrasonic data by emitting ultrasonic signals in a corner direction of the vehicle 10 and receiving echo ultrasonic signals reflected from an object positioned in the corner direction. The rear ultrasonic sensor 140 may obtain rear ultrasonic data by emitting ultrasonic signals to the rear of the vehicle 10 and receiving echo ultrasonic signals reflected from an object positioned at the rear.

Referring to FIG. 2, the front ultrasonic sensor 120 may have a field of sensing 120a facing the front of the vehicle 10. The front ultrasonic sensor 120 may be installed in, for example, a grille or bumper of the vehicle 10. The forward ultrasonic data may include distance information, size information, and speed degree of an object located in front of the vehicle 10.

The corner ultrasonic sensors 130 include a first corner ultrasonic sensor 130-1 installed on a front right side of the vehicle 10, a second corner ultrasonic sensor 130-2 installed on a front left side of the vehicle 10, a third corner ultrasonic sensor 130-3 installed on a rear right side of the vehicle 10, and a fourth corner ultrasonic sensor 130-4 installed on a rear left side of the vehicle 10.

The first corner ultrasonic sensor 130-1 may have a field of sensing 130-1a facing the front right side of the vehicle 10. The second corner ultrasonic sensor 130-2 may have a field of sensing 130-2a facing the front left side of the vehicle 10. The third corner ultrasonic sensor 130-3 may have a field of sensing 130-3a facing the rear right side of the vehicle 10. The fourth corner ultrasonic sensor 130-4 may have a field of sensing 130-4a facing the rear left side of the vehicle 10.

The first corner ultrasonic sensor 130-1 may obtain first corner ultrasonic data, the second corner ultrasonic sensor 130-2 may obtain second corner ultrasonic data, the third corner ultrasonic sensor 130-3 may obtain third corner ultrasonic data, and the fourth corner ultrasonic sensor 130-4 may obtain fourth corner ultrasonic data. The first corner ultrasonic data may include distance information, size information, and speed degree of an object located on the front right side of the vehicle 10. The second corner ultrasonic data may include distance information, size information, and speed degree of an object located on the front left side of the vehicle 10. The third corner ultrasonic data may include distance information and speed information on an object located on the rear right side of the vehicle 10. The fourth corner ultrasonic data may include distance information and speed information on an object located on the rear left side of the vehicle 10.

The rear ultrasonic sensor 140 may have a field of sensing facing the rear of the vehicle 10. The rear ultrasonic sensor 140 may be installed, for example, on a rear windshield glass of the vehicle 10. The rear ultrasonic data may include distance information and speed degree of an object located at the rear of the vehicle 10.

The controller 300 may process the front ultrasonic data transmitted from the front ultrasonic sensor 120 to identify an object positioned in front of the vehicle 10. The controller 300 may process the corner ultrasonic data transmitted from the corner ultrasonic sensor 130 to identify an object located in the corner direction of the vehicle 10. The controller 300 may process the rear ultrasonic data transmitted from the rear ultrasonic sensor 140 to identify an object located at the rear of the vehicle 10.

The ultrasonic sensors 120, 130, and 140 may be replaced with radar sensors. Furthermore, the vehicle 10 may be provided with an ultrasonic sensor and a radar sensor together.

The warning device 150 may provide at least one of a visual warning and an audible warning. The visual warning may be provided through a lamp provided on the exterior of the vehicle 10. The audible warning may be provided through a speaker provided inside the vehicle 10. The controller 300 may control the warning device 150 to output a warning based on detection of an object in a location close to the vehicle 10.

The user interface 200 may include an input device 210 and a display 220. The input device 210 and the display 220 may be provided at various positions inside the vehicle 10. For example, the user interface 200 may be provided in a cluster and/or a center fascia.

The input device 210 may be provided on the center fascia, the head unit, and/or the steering wheel. The input device 210 may include a button, a dial, and/or a touchpad related to various functions of the vehicle 1. For example, the input device 210 may include a push button, a touch button, a touch pad, a touch screen, a dial, a stick-type operation device, and/or a track ball. The input device 210 may be provided integrally with the display 220.

The display 220 may output various information related to a function, state, and/or operation of the vehicle 1. The display 220 may output a graphic user interface (GUI) including an object (e.g., icon, text, and image) for executing or setting various functions of the vehicle 1. The GUI may interact with user input. The display 220 may output a screen corresponding to the input to an object.

The display 220 may be a light emitting diode (LED) panel, an organic light emitting diode (OLED) panel, or a liquid crystal display (LCD) panel. In addition, the display 220 may include a touch screen.

Electronic components provided in the vehicle 10 may communicate with each other through the NT. For example, electronic components may exchange data via networks such as Ethernet, Media Oriented Systems Transport (MOST), Flexray, Controller Area Network (CAN), and Local Interconnect Network (LIN).

The controller 300 may include a memory 320 that memorizes/stores programs, instructions, and data for controlling operations of the vehicle 10, and a processor 310 that generates a control signal for controlling the operations of the vehicle 10 based on the programs, instructions, and data memorized/stored in the memory 320. The processor 310 may include a digital processor that processes data of various sensors and a micro control unit (MCU) that generates a control signal. The processor 310 and the memory 320 may be implemented as separate chips or as a single chip. In addition, the controller 300 may include a plurality of processors 310 and a plurality of memories 320.

The processor 310 may include a logic circuit and an arithmetic circuit, process data according to programs and/or instructions provided from the memory 320, and generate control signals according to a processing result. The processor 310 may be electrically connected to various devices included in the vehicle 10.

The memory 320 may include not only volatile memories such as a static random access memory (SRAM) and a dynamic random-access memory (DRAM), but also non-volatile memory such as a flash memory, a read-only memory (ROM), and an erasable programmable read only memory (EPROM).

The configurations of the vehicle 10 are not limited to the description above. Some of the devices shown in FIG. 1 may be omitted depending on design. In addition, various devices other than the described above devices may be added to the vehicle 10.

As described above, the image recording device wo may be set to operate in the regular recording mode, the shock recording mode, or the detection recording mode according to a user's selection. The regular recording mode has a disadvantage in that battery consumption is large because it always photographs surroundings of the vehicle and stores the obtained surrounding images. The shock recording mode has a disadvantage in that it is difficult to grasp the situation before and after the impact because only a short image is saved when the impact occurs.

Conventionally, a vehicle does not operate the ultrasonic sensors when the engine is turned off after parking. In addition, the existing vehicle only provides a regular recording method and a shock recording method as a recording method of the image recording device 100.

However, the vehicle 10 according to an exemplary embodiment of the disclosure may operate the image recording device 100 in conjunction with the ultrasonic sensors 120, 130, and 140 provided in the vehicle 10. In the detection recording mode, the controller 300 may control the image recording device wo to store the image of the surroundings of the vehicle in response to an object being detected around the vehicle using the ultrasonic sensors 120, 130, and 140. Because the images of the surroundings of the vehicle are not always recorded after parking, usage efficiency of the battery may be improved. In addition, because the images of the surroundings of the vehicle are stored from a time of object detection, the user may easily identify the situation before and after occurrence of an event through the stored images.

Hereinafter, a method of obtaining the image of the surroundings of the vehicle by interworking the image recording device 100 with the ultrasonic sensors 120, 130, and 140 will be described.

The controller 300 may operate the ultrasonic sensors 120, 130, and 140 when the engine is turned off after the vehicle 10 is parked. The controller 300 may operate the image recording device 100 in a standby mode after the vehicle 10 is parked. The standby mode may be referred to as a power saving mode or a sleep mode. In the standby mode, the power of the image recording device wo is turned on, but it does not actually operate. In other words, in the standby mode, the front and rear cameras 111 and 112 of the image recording device 100 may not operate.

The controller 300 may switch the image recording device 100 to an active mode based on the detection of an object in the vicinity of the vehicle by the ultrasonic sensors 120, 130, and 140, and control the image recording device 100 so as to store the images of the surroundings of the vehicle. The controller 300 may identify objects located around the vehicle based on the ultrasonic data transmitted from the ultrasonic sensors 120, 130, and 140. The active mode of the image recording device 100 may be referred to as a wakeup mode.

In response to the image recording device 100 being switched to the active mode, the front and rear cameras 111 and 112 of the image recording device 100 may operate. Accordingly, the images of the surroundings of the vehicle may be obtained, and the images of the surroundings of the vehicle may be stored in the memory 113 of the image recording device 100 and/or the memory 320 of the controller 300.

The controller 300 may switch the image recording device wo to the active mode based on the detection of an object within predetermined detection ranges of the ultrasonic sensors 120, 130, and 140. The controller 300 may adjust the detection ranges of the ultrasonic sensors 120, 130, and 140 based on the detection range selection instruction obtained through the input device 210. The user may operate the input device 210 to select the detection ranges of the ultrasonic sensors 120, 130, and 140 within a predetermined minimum detection range and a predetermined maximum detection range.

The controller 300 may control the image recording device wo to store the images of the surroundings of the vehicle based on a predetermined image storage condition after the image recording device 100 is switched to the active mode. For example, the controller 300 may control the image recording device 100 so as to store the images of the surroundings of the vehicle based on the fact that a detection duration time of the object within the detection ranges of the ultrasonic sensors 120, 130, and 140 is longer than or equal to a predetermined threshold time. The controller 300 may control the image recording device 100 so as to store the images of the surroundings of the vehicle photographed from an object detection start time to an object detection end time. After the image recording device 100 is switched to the active mode, the controller 300 may switch the image recording device 100 back to the standby mode based on the fact that the detection duration time of the object is shorter than the predetermined threshold time.

The controller 300 may adjust the threshold time based on a threshold time selection instruction obtained through the input device 210. The user may operate the input device 210 to select the threshold time between a predetermined minimum threshold time and a predetermined maximum threshold time.

Furthermore, the controller 300 may adjust the sensitivity related to the detection of the object based on a sensitivity selection instruction obtained through the input device 210. For example, when the sensitivity for the detection of the object is set to be high, even an object having a small size may be included in a detection target. When the sensitivity is set to be low, an object having a small size may be excluded from the detection target. The user may select the sensitivity for the detection of the object by manipulating the input device 210.

As such, the user may adjust the detection ranges of the ultrasonic sensors 120, 130, and 140, the threshold time for the detection of the object, and the sensitivity for the detection of the object. Acquisition of images unnecessary to the user according to the user's selection may be prevented, and convenience of the user may be improved.

Figure 3:
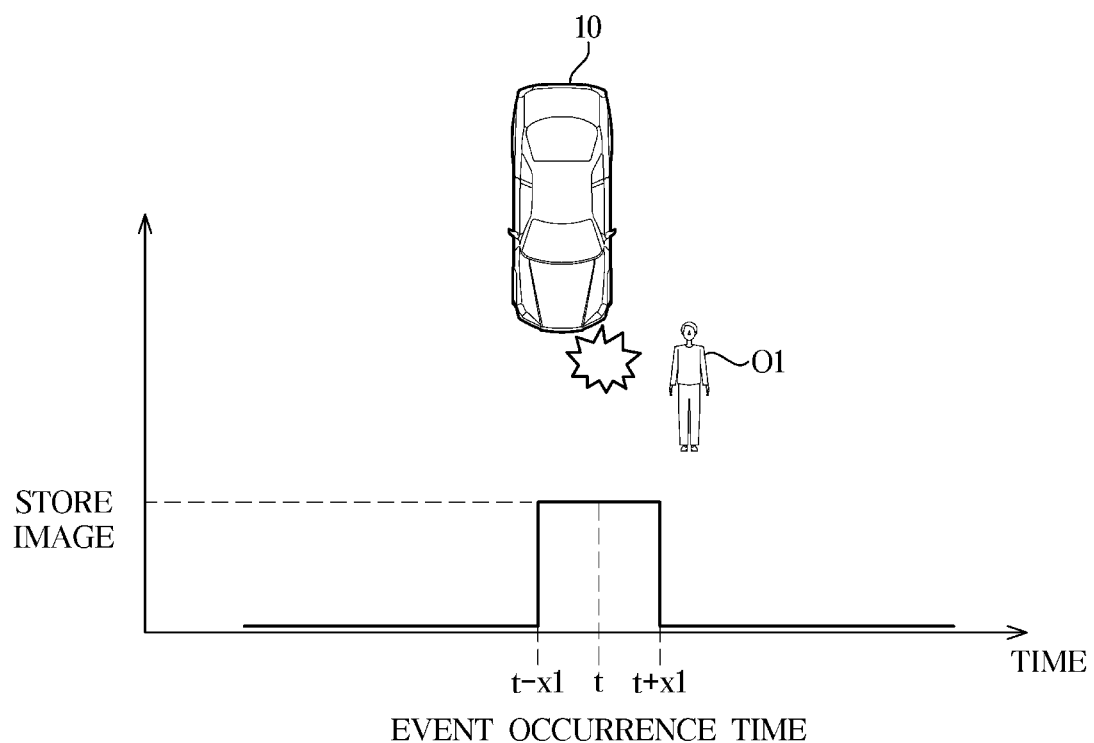
FIG. 3 is a graph for explaining an image recording method during parking in the prior art.
Figure 4:
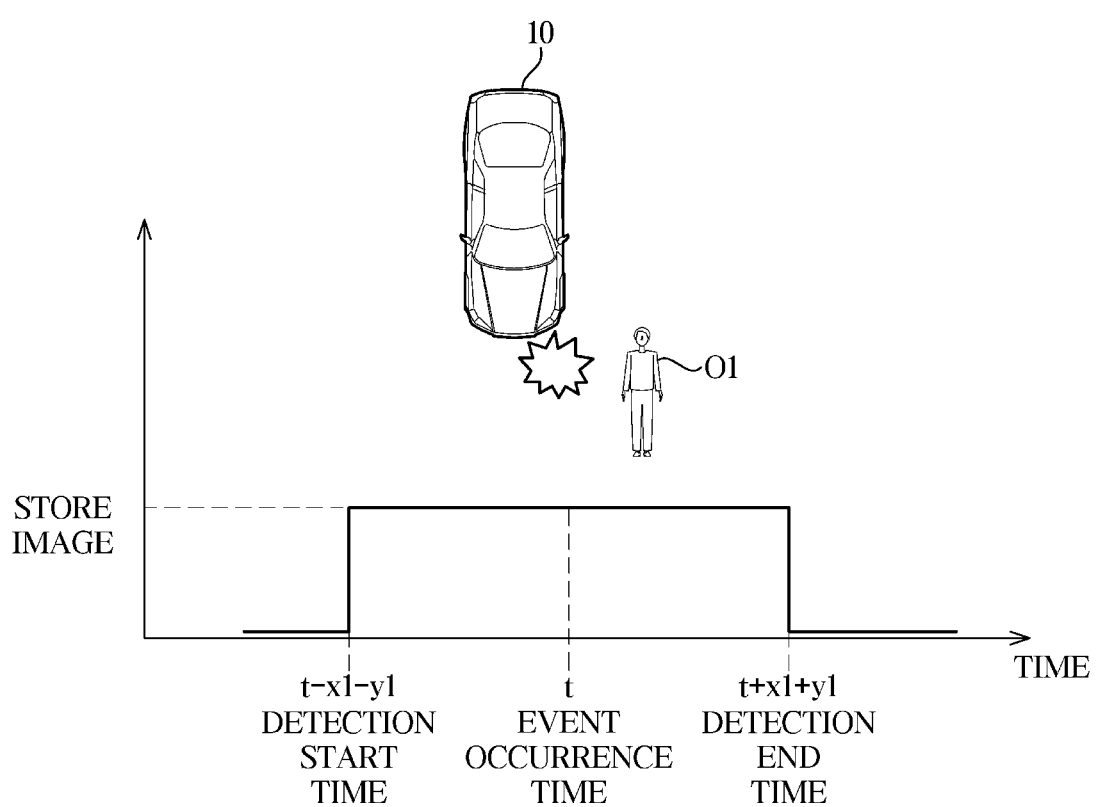
FIG. 4 is a graph for explaining the image of the surroundings of a vehicle related to occurrence of an event during parking obtained by a method of controlling a vehicle according to an exemplary embodiment of the present disclosure.

FIG. 3 is a graph for explaining an image recording method during parking in the prior art. FIG. 4 is a graph for explaining the images of the surroundings of the vehicle related to occurrence of an event during parking obtained by a method of controlling the vehicle according to an exemplary embodiment of the disclosure.

Referring to FIG. 3, in the prior art, when the vehicle is parked and the engine of the vehicle is turned off, the cameras are basically always operated to photograph surroundings of the vehicle. Thereafter, in the prior art, when an event such as an impact occurs to the vehicle 10, an image of a predetermined short section from an event occurrence time t is stored. For example, when an object O1 such as a person collides with the vehicle 10, in the prior art, a limited image from a time t−x1 before a time t, which is the event occurrence time, to a time t+x1, which is after the time t, is stored. Herein, x1 is limited to 10 seconds.

Conventionally, the surroundings of the vehicle are always photographed, so that the battery consumption is large. In addition, conventionally, only a short image by using the occurrence of an event such as an impact as a trigger is stored, so that the situation in which the event occurred may not be specifically provided with only the stored image. In addition, conventionally, it is not possible to easily obtain an image of another behavior such as putting dirt on the vehicle by another person other than an impact applied to the vehicle 10. In the case of the regularly recorded (or always-recorded images), all images are provided after parking, while the user needs to find the timing of the event while watching all of the images, thereby causing inconvenience.

Referring to FIG. 4, the vehicle 10 according to an exemplary embodiment of the disclosure provides the detection recording mode for storing the images of the surroundings of the vehicle when an object is detected around the vehicle using the ultrasonic sensors 120, 130, and 140. The controller 300 of the vehicle 10 may operate the image recording device 100 in the standby mode after the vehicle 10 is parked. The controller 300 may switch the image recording device 100 to the active mode based on the detection of the object O1 in the vicinity of the vehicle 10 by the ultrasonic sensors 120, 130, and 140.

For example, the image recording device 100 of the vehicle 10 may store the images of the surroundings of the vehicle photographed from a time t−x1−y1, which is a start time of object detection, to a time t+x1+y1, which is an end time of object detection. The image stored from the time t−x1−y1 to the time t+x1+y1 includes the event occurrence time t. As described above, the vehicle 10 according to an exemplary embodiment of the present disclosure stores the images of the surroundings of the vehicle from the time of object detection, so that the user may easily identify the situation before and after the occurrence of the event through the stored images.

Furthermore, the operating current of the ultrasonic sensors 120, 130, and 140 is smaller than that of the image recording device 100. For example, the operating current of the ultrasonic sensors 120, 130, and 140 is a maximum of 350 mA, and the operating current of the image recording device 100 is 760 mA. Accordingly, power consumption when the ultrasonic sensors 120, 130, and 140 are always operated after parking is smaller than power consumption when the image recording device 100 is always operated. As described above, usage efficiency of the battery may be improved by operating the ultrasonic sensors 120, 130, and 140 in conjunction with the image recording device 100.

FIG. 5 is a flowchart illustrating a method of controlling the vehicle according to an exemplary embodiment of the present disclosure.

Referring to FIG. 5, the vehicle 10 according to embodiments of the disclosure may operate the ultrasonic sensors 120, 130, and 140 when the engine of the vehicle is turned off after parking (501, 502). The controller 300 of the vehicle 10 may operate the image recording device 100 in the standby mode after the vehicle 10 is parked (503).

The controller 300 may determine whether an object exists within a detection range of the ultrasonic sensors 120, 130, 140 based on the ultrasonic data obtained by the ultrasonic sensors 120, 130, and 140 (504). In response to the object being detected within the detection range of the ultrasonic sensors 120, 130, and 140, the controller 300 may switch the image recording device 100 to the active mode and operate the cameras 111 and 112 (505). In response to the object not being detected within the detection range, the image recording device 100 may continue to operate in the standby mode.

The controller 300 may control the image recording device 100 to store the image of the surroundings of the vehicle based on the predetermined image storage condition after the image recording device wo is switched to the active mode. For example, the controller 300 may calculate the detection duration time, which is the time the object stays within the detection range of the ultrasonic sensors 120, 130, and 140. The controller 300 may determine whether the detection duration time of the object within the detection range of the ultrasonic sensors 120, 130, and 140 is longer than or equal to the predetermined threshold time (506). The controller 300 may control the image recording device 100 to store the image of the surroundings of the vehicle based on the fact that the detection duration time of the object within the detection range of the ultrasonic sensors 120, 130, 140 is longer than or equal to the predetermined threshold time. The controller 300 may control the image recording device wo to store the image of the surroundings of the vehicle photographed from the object detection start time to the object detection end time (507). After the image recording device 100 is switched to the active mode, the controller 300 may switch the image recording device wo back to the standby mode based on the fact that the detection duration time of the object is shorter than the predetermined threshold time.

As is apparent from the above, the vehicle and the method of controlling the same according to various embodiments of the disclosure may control the image recording device to store the image of the surroundings of the vehicle in response to the object being detected in the vicinity of the vehicle during parking using the ultrasonic sensors. Accordingly, power consumed to obtain the image of the surroundings of the vehicle during parking may be reduced, thereby improving usage efficiency of the battery.

Furthermore, the vehicle and the method of controlling the same according to various embodiments of the disclosure may provide continuous images related to the occurrence of the event from the time of detection of the object during parking, so that the user may easily grasp the situation before and after the occurrence of the event.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a read only memory (ROM), a random access memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle comprising:
an image recording device;
an input device;
an ultrasonic sensor; and
a controller configured to:
operate the ultrasonic sensor in response to parking of the vehicle;
operate the image recording device to a standby mode;
switch the image recording device to an active mode based on a detection of an object located around the vehicle by the ultrasonic sensor; and
control the image recording device to store an image of surroundings of the vehicle obtained by the image recording device;
wherein the controller is further configured to adjust sensitivity for the detection of the object based on a sensitivity selection instruction obtained through the input device; and
wherein the sensitivity selection instruction is a command for selecting an object size of the object to be detected, and when the sensitivity is set to high, objects with smaller sizes are included in a detection target compared to when the sensitivity is set to low.

2. The vehicle of claim 1, wherein the controller is further configured to control the image recording device to store the image of the surroundings of the vehicle photographed from an object detection start time to an object detection end time.

3. The vehicle of claim 1, wherein the controller is further configured to switch the image recording device to the active mode based on the detection of the object within a detection range of the ultrasonic sensor.

4. The vehicle of claim 3, wherein the controller is further configured to adjust the detection range of the ultrasonic sensor based on a detection range selection instruction obtained through the input device.

5. The vehicle of claim 3, wherein the controller is further configured to control the image recording device to store the image of the surroundings of the vehicle based on a predetermined image storage condition after the image recording device is switched to the active mode.

6. The vehicle of claim 5, wherein the controller is further configured to control the image recording device to store the image of the surroundings of the vehicle based on a detection duration time of the object being longer than or equal to a threshold time within the detection range.

7. The vehicle of claim 6, wherein the controller is further configured to adjust the threshold time based on a threshold time selection instruction obtained through the input device.

8. The vehicle of claim 3, wherein the controller is further configured to switch the image recording device to the standby mode based on a detection duration time of the object being shorter than a predetermined threshold time after the image recording device is switched to the active mode.

9. A method of controlling a vehicle using a controller, the method comprising:
operating an ultrasonic sensor to detect an object located around the vehicle in response to parking of the vehicle;
operating an image recording device in a standby mode;
switching the image recording device to an active mode based on a detection of the object in a vicinity of the vehicle; and
storing an image of surroundings of the vehicle obtained by the image recording device;
wherein the method further comprises adjusting sensitivity for the detection of the object based on a sensitivity selection instruction obtained through an input device; and
wherein the sensitivity selection instruction is a command for selecting an object size of the object to be detected, and when the sensitivity is set to high, objects with smaller sizes are included in a detection target compared to when the sensitivity is set to low.

10. A method of controlling a vehicle using a controller, the method comprising:
operating an ultrasonic sensor to detect an object located around the vehicle in response to parking of the vehicle;
operating an image recording device in a standby mode;
switching the image recording device to an active mode based on a detection of the object in a vicinity of the vehicle; and
storing an image of surroundings of the vehicle obtained by the image recording device from an object detection start time to an object detection end time;
wherein the method further comprises adjusting sensitivity for the detection of the object based on a sensitivity selection instruction obtained through an input device; and
wherein the sensitivity selection instruction is a command for selecting an object size of the object to be detected, and when the sensitivity is set to high, objects with smaller sizes are included in a detection target compared to when the sensitivity is set to low.

11. The method of claim 9, wherein switching the image recording device to the active mode is performed based on the detection of the object being within a detection range of the ultrasonic sensor.

12. The method of claim 11, wherein the detection range of the ultrasonic sensor is adjustable based on a detection range selection instruction obtained through the input device.

13. The method of claim 11, wherein storing the image of the surroundings of the vehicle is performed based on satisfaction of a predetermined image storage condition after the image recording device is switched to the active mode.

14. The method of claim 13, wherein storing the image of the surroundings of the vehicle is performed based on a detection duration time of the object being longer than or equal to a threshold time within the detection range.

15. The method of claim 14, wherein the threshold time is adjustable based on a threshold time selection instruction obtained through the input device.

16. The method of claim 11, further comprising switching the image recording device to the standby mode based on a detection duration time of the object being shorter than a predetermined threshold time after the image recording device is switched to the active mode.

17. The vehicle of claim 2, wherein the controller is further configured to switch the image recording device to the active mode based on the detection of the object within a predetermined detection range of the ultrasonic sensor.

18. The vehicle of claim 17, wherein the controller is further configured to adjust a detection range of the ultrasonic sensor based on a detection range selection instruction obtained through the input device.

19. The vehicle of claim 17, wherein the controller is further configured to control the image recording device to store the image of the surroundings of the vehicle based on a predetermined image storage condition after the image recording device is switched to the active mode.

20. The vehicle of claim 17, wherein the controller is further configured to switch the image recording device to the standby mode based on a detection duration time of the object being shorter than a predetermined threshold time after the image recording device is switched to the active mode.

* * * * *